(12) United States Patent
Mu et al.

(10) Patent No.: US 8,112,410 B2
(45) Date of Patent: *Feb. 7, 2012

(54) METHOD FOR SEARCHING ACROSS INSTANT MESSAGE SYSTEMS AND INTERCONNECTING SERVER

(75) Inventors: Lunjian Mu, Shenzhen (CN); Jue Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 428 days.

This patent is subject to a terminal disclaimer.

(21) Appl. No.: 12/348,700

(22) Filed: Jan. 5, 2009

(65) Prior Publication Data

US 2009/0157698 A1 Jun. 18, 2009

Related U.S. Application Data

(63) Continuation of application No. 11/500,270, filed on Aug. 7, 2006, now Pat. No. 7,490,076.

(30) Foreign Application Priority Data

Aug. 9, 2005 (CN) .......................... 2005 1 0085774

(51) Int. Cl.
*G06F 7/00* (2006.01)
(52) U.S. Cl. ........ 707/707; 707/602; 707/607; 707/613; 709/201; 709/203; 709/217; 709/218; 709/219; 455/3.01; 455/3.05; 455/403; 455/412.1
(58) Field of Classification Search .................. 455/3.01, 455/3.05, 403, 412.1; 709/201, 203, 217, 709/218, 219; 707/1, 3, 4, 10
See application file for complete search history.

(56) References Cited

U.S. PATENT DOCUMENTS

| | | | |
|---|---|---|---|
| 6,931,453 B2 * | 8/2005 | Aarnos et al. ................. | 709/245 |
| 2002/0021307 A1 * | 2/2002 | Glenn et al. .................. | 345/753 |
| 2002/0178163 A1 * | 11/2002 | Mayer ............................ | 707/10 |
| 2003/0093405 A1 * | 5/2003 | Mayer ............................. | 707/1 |
| 2005/0160146 A1 | 7/2005 | Arnoff | |
| 2008/0082678 A1 * | 4/2008 | Lorch et al. .................. | 709/230 |

FOREIGN PATENT DOCUMENTS

CN 1558689 A 12/2004

(Continued)

OTHER PUBLICATIONS

"HP Presence and Availability Solution" May 2005 as taken from http://h71028.www7.hp.com/ERC/downloads/4AA0-0632ENW.pdf archived Oct. 27, 2005 by Archive.org.*

(Continued)

*Primary Examiner* — Etienne Leroux
*Assistant Examiner* — Bruce Witzenburg
(74) *Attorney, Agent, or Firm* — Leydig, Voit & Mayer, Ltd.

(57) ABSTRACT

A method for searching across instant message systems and an interconnecting server are disclosed in the present invention. The method includes: searching in a SIMPLE IM system by a WV-IMPS user, and searching in a WV-IMPS system by a SIMPLE IM user. The interconnecting server includes a message input/output module and a message processing and converting module. The technical solution of the present invention seamlessly connects the search services of the WV-IMPS instant message system and the SIMPLE instant message system, and thus solves the problem on interconnecting search functions between different types of instant message systems.

20 Claims, 5 Drawing Sheets

FOREIGN PATENT DOCUMENTS

| | | |
|---|---|---|
| CN | 100488176 C | 5/2009 |
| WO | WO 2004/031976 A1 | 4/2004 |
| WO | WO 2005/022863 A1 | 3/2005 |

OTHER PUBLICATIONS

"HP Presence and Availability Solution," May 2005 as taken from http://h71028.www7.hp.com/ERC/downloads/4AA0-0632ENw.PDF Archived Oct. 27, 2005 by Archive.org.

Huang et al., "Intelligent Agent of Instant Message Systems," *China Academic Journal*, 2004, pp. 256, 257 and 260, 1994-2006 China Academic Journal Electronic Publishing House, China.

International Search Report for PCT/CN2006/001223, dated Sep. 21, 2006.

Image File Wrapper in corresponding U.S. Appl. No. 11/500,270 (Nov. 15, 2011).

Written Opinion of the International Searching Authority in corresponding PCT Application No. PCT/CN/2006001223 (Sep. 21, 2006).

$1^{st}$ Office Action in corresponding Chinese Application No. 200510085774.X (Feb. 15, 2008).

$2^{nd}$ Office Action in corresponding Chinese Application No. 200510085774.X (Sep. 5, 2008).

* cited by examiner

METHOD FOR SEARCHING ACROSS INSTANT MESSAGE SYSTEMS AND INTERCONNECTING SERVER

CROSS-REFERENCE TO RELATED APPLICATIONS

This application is a continuation of U.S. patent application Ser. No. 11/500,270 filed Aug. 7, 2006, which claims priority to Chinese Patent Application No. 200510085774.X, filed Aug. 9, 2005, both of which are hereby incorporated by reference in their entirety.

FIELD OF THE INVENTION

The present invention relates to instant message systems, and more particularly, to a method for searching across instant message systems and an interconnecting server.

BACKGROUND

Instant message service has been applied to mobile communication networks and the Internet. The mobile communication networks may include the existing 2nd Generation Network (2G), 2.5 Generation Network (2.5G), the developing 3rd Generation Network (3G), and the IP Multimedia Subsystem (IMS), etc.

Instant message service is known as a kind of mobile data service for person-to-person or person-to-group messages based on Presence service.

The Open Mobile Alliance (OMA) institutes standards for the mobile instant message. Two types of instant message systems exist in the current specifications: one is the instant message system based on the Wireless Village (WV), which is based on protocols carried by Hyper Text Transport Protocol (HTTP)/Wireless Access Protocol (WAP)/Short Message Service (SMS) Protocol. The system is capable of supporting 2.5G/3G network, and is mainly applied to the traditional communication networks; the other is the instant message system based on the SIP/SIMPLE, which is based on protocols carried by SIP/SIMPLE and is mainly applied to the next generation IP network based on the IMS. For an end-user, the above WV and SIMPLE protocols are transparent, that is, whether you are a WV user or a SIMPLE user, you cannot be aware of any differences while using the services in the two instant message systems.

Search function, also called search service, is an important characteristic of the instant message system. Both the WV-Instant Message & Presence Service (WV-IMPS) instant message system and the SIMPLE IM system need to support the search function, and thereby from the aspect of the user, it is desired to use the search function of either system seamlessly.

In the related art, the user of a WV-IMPS instant message system (referred to as an IMPS user for short) can search for either a chat room, a member in the chat room, or a chat history, etc. in the WV-IMPS instant message system, whereas the user of a SIMPLE IM system can search for a chat room, a member in the chat room, or a chat history, etc. in the SIMPLE IM system.

SUMMARY OF THE INVENTION

A method for searching across instant message systems, which is applied to searching across a WV-IMPS instant message system and a SIP/SIMPLE instant message system is proposed in the present invention. In the method, an IMPS user terminal initiates a search request message carrying key words for searching to an IMPS server; the IMPS server receives the search request message, and judges according to the key words for searching so that when the search is desired within a SIMPLE IM server, forwards the search request message to an interconnecting server through a SSP message; the interconnecting server converts the SSP search request message to a SIMPLE IM search request message, and forwards it to the SIMPLE IM server; the SIMPLE IM server finds a search result matching the key words for searching and returns a SIMPLE IM search response message to the interconnecting server; the interconnecting server converts the SIMPLE IM search response message to a SSP search response message, and forwards it to the IMPS server; and the IMPS server processes the SSP search response message, and returns the search result to the IMPS user terminal.

An interconnecting server, which is applied to searching across a WV-IMPS instant message system and a SIP/SIMPLE instant message system, and the server includes a message input/output module and a message processing and converting module. The message input/output module is connected with an IMPS server and a SIMPLE IM server, and is configured for receiving a search request message or a search response message from an IMPS server or a SIMPLE IM server and for sending the message to the message processing and converting module, and further for receiving a message converted by the message processing and converting module and for forwarding the message to the IMPS server or the SIMPLE IM server; and the message processing and converting module is configured for analyzing the search request message or the search response message, and for implementing a conversion between a SSP message from the IMPS server and a SIMPLE instant message from the SIMPLE IM server.

DETAILED DESCRIPTION OF THE INVENTION

According to the present invention, the method for searching across a WV-IMPS instant message system and a SIMPLE IM system includes searching in a SIMPLE IM system by an IMPS user, and searching in a WV-IMPS system by a SIMPLE IM user. The detailed description on the processes will be given below with reference to the drawings.

Figure 1:
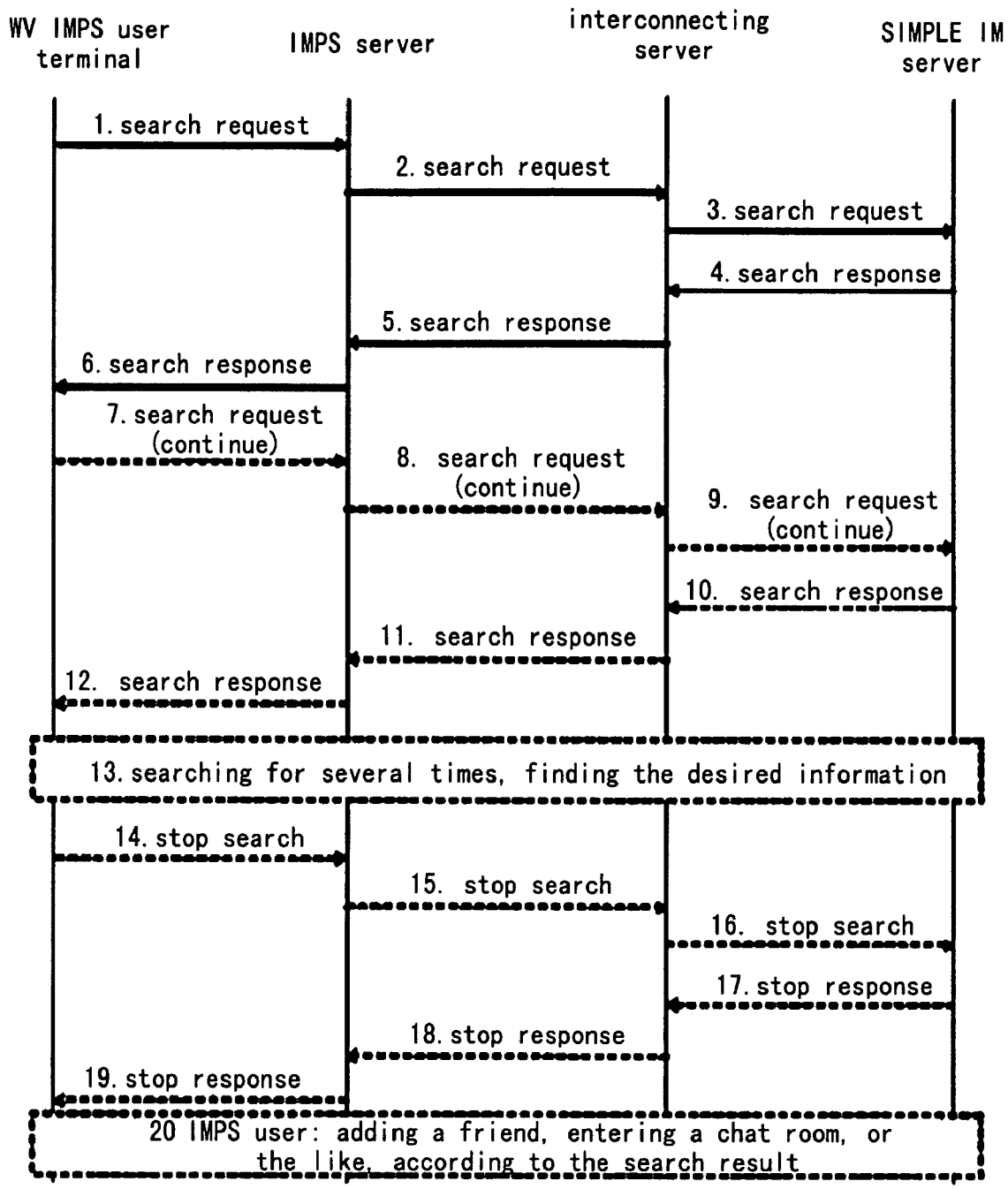
FIG. 1 is a schematic diagram showing a process of search by an IMPS user in a SIMPLE IM system according to an embodiment of the present invention.

The specific process, as shown in FIG. 1, in which an IMPS user may search in the SIMPLE IM system for information of either a user, a chat room, a member in a chat room, or a chat history of a chat room, etc., includes steps as below.

In step 1, the IMPS user selects to search with a user terminal (such as a mobile terminal, a PC terminal, etc.) of the IMPS system, for information such as a user, a chat room, a member in a chat room, or a chat history of a chat room, etc. in the SIMPLE IM system; and the user terminal of the IMPS system sends a search request message in response to the key words for searching entered by the IMPS user, which includes, but not limited to, such as ages.

In step 2, an instant message server of the IMPS system (referred to as an IMPS server for short) receives the search request message, and then judges according to the user's key words for searching, so that when the search is desired within an instant message server of the SIMPLE IM system (referred to as a SIMPLE IM server for short), it may forward the search request message to an interconnecting server using the Server-Server Protocol (SSP); and further, according to the system settings, the IMPS server may search for the information satisfying the key words for searching locally.

In step 3, the interconnecting server converts the search request message based on the SSP to a search request message based on the SIMPLE IM system protocol, and forwards the search request message based on the SIMPLE IM system protocol to the SIMPLE IM server. Herein, the search request message based on the SIMPLE IM system protocol may be a search request message based on the SIP/SIMPLE, XML Configuration Access Protocol (XCAP), or Hyper Text Transport Protocol (HTTP), etc.

In step 4, the SIMPLE IM server receives the above search request message and searches in the SIMPLE IM server and relating servers according to the key words for searching in the message, and returns a search result through a search response message based on the SIMPLE IM system protocol to the interconnecting server.

In step 5, the interconnecting server converts the search response message based on the SIMPLE IM system protocol to a search response message based on the SSP, and forwards it to the IMPS server.

In step 6, the IMPS server processes the search response message to get the search result from the SIMPLE IM server, and returns the search result through a search response message to the user terminal of the IMPS system; or further, in the case of searching locally according to the system settings, it may combine the search result from the interconnecting server with the local search result, and return it to the user terminal of the IMPS system (i.e., combine the search result of the SIMPLE IM server and that of the local IMPS server as a current search result to be returned to the user terminal), and then the IMPS user may check by the user terminal whether there is any desired search result.

In steps 7-12, as optional steps, if it fails to search out the information desired by the user, the user may change the key words for searching and request to continue the search, while the steps are similar to the previous search (steps 1-6) except that the search request message carries a firstly returned search ID and a start serial number of the previous search response message or the number of searching times.

In step 13, the user may keep searching until a desired search result is found or all the key words for searching are gone through.

If the desired search result is found or it may need to suspend the search, the user terminal of the IMPS system may send a stop search request to the IMPS server. The steps are similar to those mentioned above, and particularly include:

In step 14, the IMPS user terminal sends a stop search request message to the IMPS server.

In step 15, the IMPS server forwards the stop search request message to the interconnecting server by using an SSP message.

In step 16, the interconnecting server converts the stop search request message based on the SSP to a stop search request message based on the SIMPLE IM system protocol, and forwards it to the SIMPLE IM server.

In step 17, the SIMPLE IM server stops the current search and returns the stop search response message based on the SIMPLE IM system protocol to the interconnecting server.

In step 18, the interconnecting server converts the stop search response message based on the SIMPLE IM system protocol to a stop search response message based on the SSP, and forwards it to the IMPS server.

In step 19, the IMPS server returns the stop search response message to the IMPS user terminal.

In step 20, the user may add the user found as a friend, or enter the chat room found, or the like, according to the search result.

Figure 2:
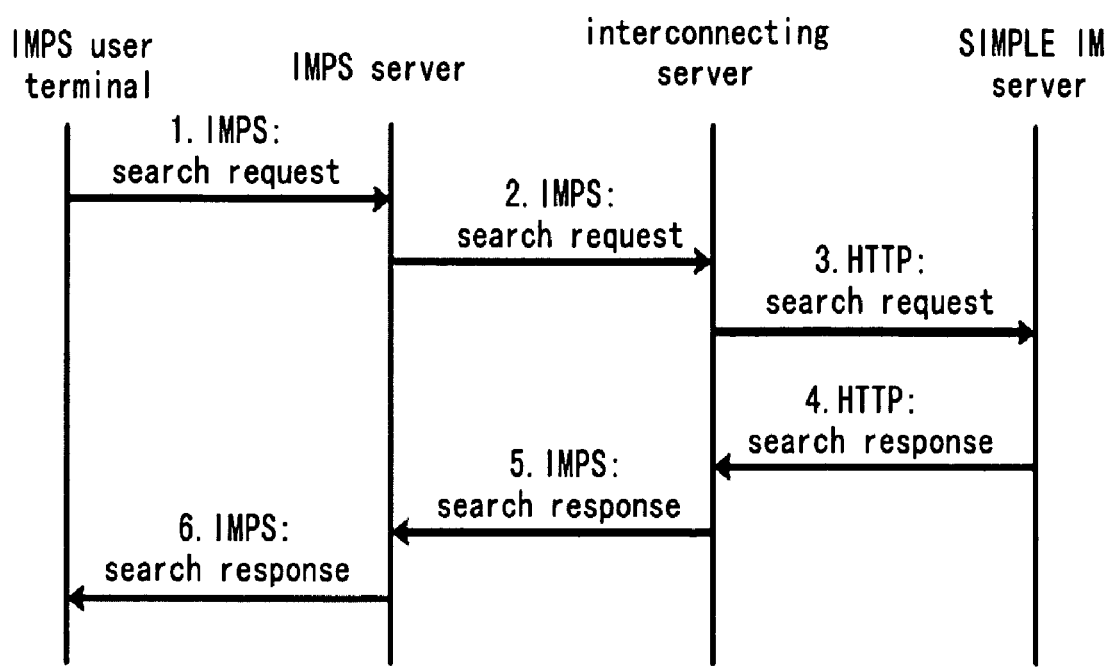
FIG. 2 is a schematic diagram showing a signaling process of search by an IMPS user in a SIMPLE IM system according to an embodiment of the present invention.

For the above search by an IMPS user in a SIMPLE IM system, the signaling process is described in FIG. 2 and specifically includes:

In step 1, with the IMPS user terminal, the IMPS user inputs the key words for searching, such as a user, a chat room, a member in a chat room, or a chat history, etc., and the IMPS user terminal sends a search request message based on the Client-Server Protocol (CSP) of the IMPS system to the IMPS server.

In step 2, the IMPS server receives the search request message, and analyzes according to the key words for searching, such as a user sip: userb@IMPLE.com and if it detects the message is sent to a SIMPLE IM server, it will send the search request message to the interconnecting server through a SSP message.

In step 3, the interconnecting server receives the search request message and converts it to a search request message based on the SIMPLE IM protocol, and forwards it to the SIMPLE IM server.

In step 4, the SIMPLE IM server receives the above search request message and searches according to the key words for searching to find the information matching the key words, then constitutes the search result as a search response message based on the SIMPLE IM system protocol and returns the search response message to the interconnecting server.

In step 5, the interconnecting server converts the returned search response message to a search response message based on the SSP of the IMPS system, and forwards it to the IMPS server.

In step 6, the IMPS server receives the search response message based on the SSP, and constitutes a CSP message carrying the search result to the IMPS user terminal.

Herein, the search request message in the step 3 and the search response message in the step 4 can be carried by protocols such as HTTP application layer protocol, XML Configuration Access Protocol (XCAP), SIP/SIMPLE or Message Session Relay Protocol (MSRP), etc.

Figure 3:
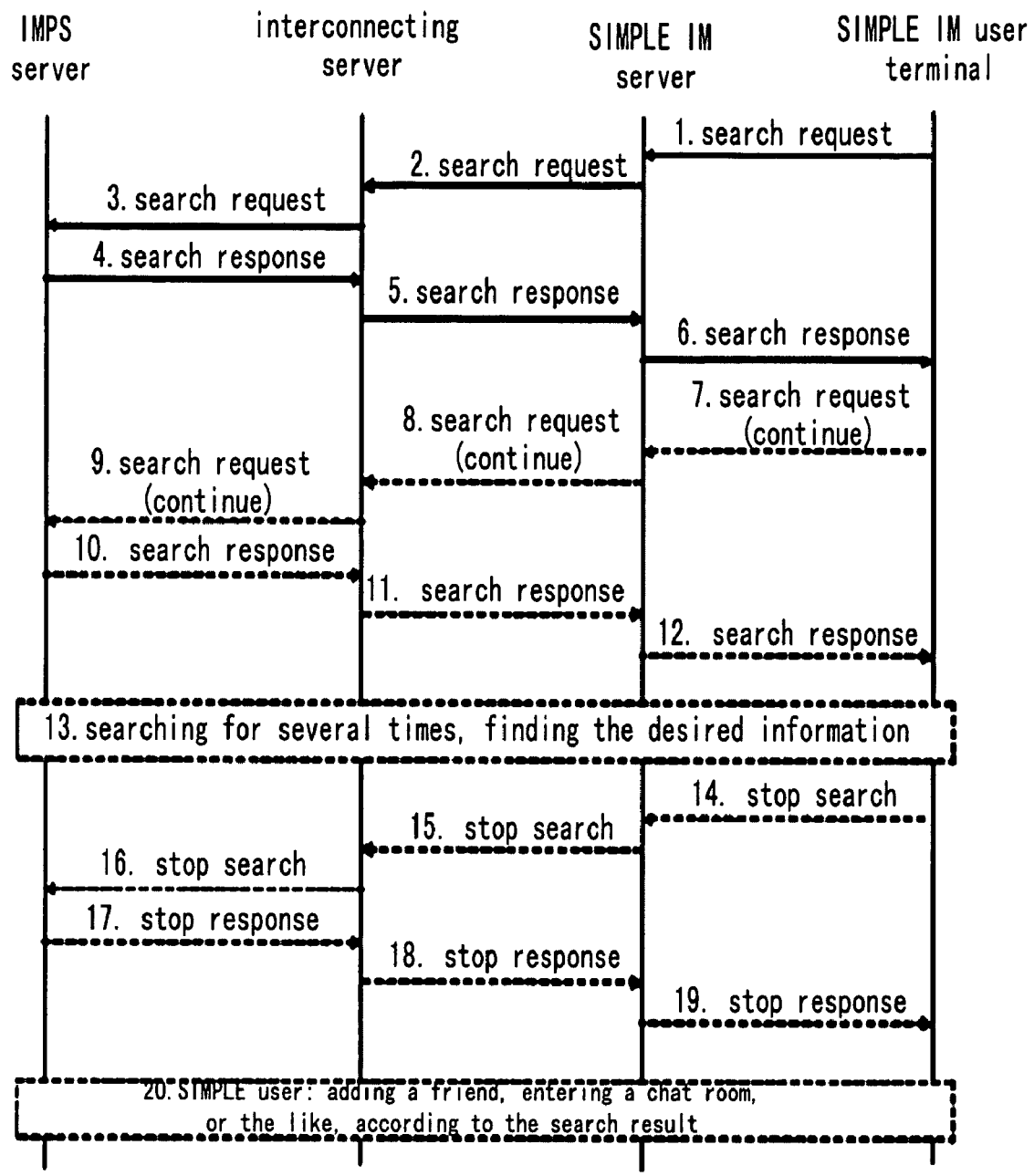
FIG. 3 is a schematic diagram showing a process of search by a SIMPLE IM user in a WV-IMPS system according to an embodiment of the present invention.

The service process for a user of a SIMPLE IM system to search in a WV-IMPS system for information such as a user, a chat room, a member in a chat room, or a chat history of a chat room, etc., is described in FIG. 3 and will be described as below.

In step 1, the SIMPLE IM user selects to search with a user terminal (such as a mobile terminal, a PC terminal, etc.) of the SIMPLE IM system; and the SIMPLE IM user terminal sends a search request message in response to the key words for searching entered by the SIMPLE IM user, which includes, but not limited to, such as ages.

In step 2, an SIMPLE IM server receives the search request message, and judges according to the user's key words for searching, so that when the search is desired within an instant message server of the WV-IMPS system (referred to as an IMPS server for short), it may forward the search request message to an interconnecting server using the SIMPLE IM system protocol; and further, according to the system settings, the SIMPLE IM server may search for the information satisfying the key words for searching locally.

In step 3, the interconnecting server converts the search request message based on the SIMPLE IM system protocol to a search request message under SSP, and forwards the search request message based on the SSP to the IMPS server. Herein, the search request message based on the SIMPLE IM system protocol may be a search request message based on the SIP/SIMPLE, XCAP, or HTTP, etc.

In step 4, the IMPS server receives the search request message and searches in the local IMPS server as well as relating servers according to the key words for searching, and returns a search result using a search response message under SSP to the interconnecting server.

In step 5, the interconnecting server converts the search response message based on the SSP to a search response message based on the SIMPLE IM system protocol, and forwards it to the SIMPLE IM server.

In step 6, the SIMPLE IM server processes the search response message to get the search result from the IMPS server, and returns the search result by a search response message to the SIMPLE IM user terminal; or further, in the case of searching locally according to the system settings, it may combine the search result from the interconnecting server with the local search result, and return that combination to the SIMPLE IM user terminal (i.e., combine the search result of the IMPS server and that of the local SIMPLE IM server as a current search result to be returned to the user terminal), and then the SIMPLE IM user may check by the user terminal whether there is any desired search result.

In steps 7-12, as optional steps, if it fails to search out the information desired by the user, the user may change the key words for searching and request to continue the search, while the steps are similar to the previous search (steps 1-6) except that the search request message carries a firstly returned search ID and a start serial number of the previous search response message.

In step 13, the user may keep searching until a desired search result is found or all the key words for searching are gone through.

If the desired search result is found or it may need to suspend the search, the user terminal of the SIMPLE IM system may send a stop search request to the SIMPLE IM server. The steps are similar to those mentioned above, and particularly include the followings.

In step 14, the SIMPLE IM user terminal sends a stop search request message to the SIMPLE IM server.

In step 15, the SIMPLE IM server forwards the stop search request message to the interconnecting server by using a SIMPLE instant message.

In step 16, the interconnecting server converts the stop search request based on the SIMPLE IM system protocol to a stop search request message based on the SSP, and forwards it to the IMPS server.

In step 17, the IMPS server stops the current search and returns the stop search response message based on the SSP to the interconnecting server.

In step 18, the interconnecting server converts the stop search response message based on the SSP to a stop search response message based on the SIMPLE IM system protocol, and forwards it to the SIMPLE IM server.

In step 19, the SIMPLE IM server returns the stop search response message to the SIMPLE IM user terminal.

In step 20, the user may add the user found as a friend, or enter the chat room found, or the like, according to the search result.

Figure 4:
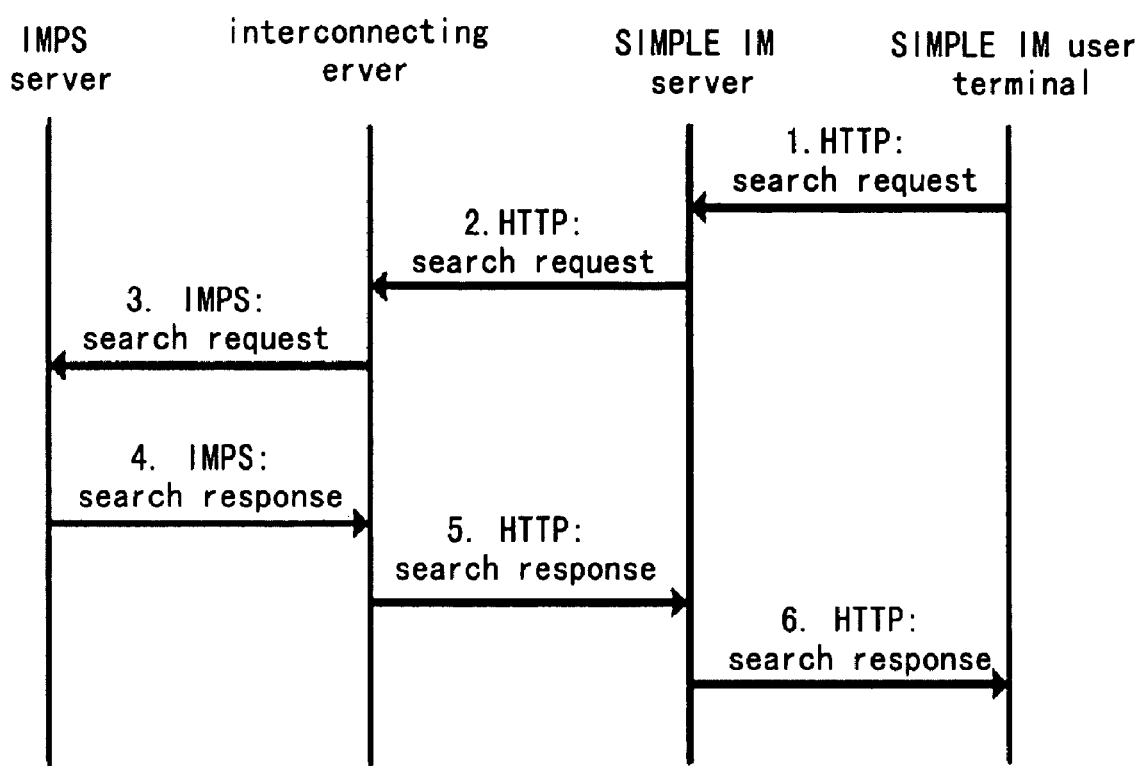
FIG. 4 is a schematic diagram showing a signaling process of search by a SIMPLE IM user in a WV-IMPS system according to an embodiment of the present invention.

For the above search by a SIMPLE IM user in a WV-IMPS system, the signaling process is depicted in FIG. 4 and specifically includes:

In step 1, with the SIMPLE IM user terminal, the SIMPLE IM user inputs the key words for searching, such as a user, a chat room, a member in a chat room, or a chat history, etc., and the SIMPLE IM user terminal sends a search request message based on the SIMPLE IM system protocol to the SIMPLE IM server.

In step 2, the SIMPLE IM server receives the search request message, and analyzes according to the key words for searching, such as a user wv: usera@IMPS.com and if it detects the message is sent to an IMPS server, it will forward the search request message to the interconnecting server.

In step 3, the interconnecting server receives the search request message and converts it to a search request message based on the SSP of the WV-IMPS system, and then forwards the message to the IMPS server.

In step 4, the IMPS server receives the above search request message and searches according to the key words for searching to find the information matching the key words, then constitutes the search result as a search response message based on the SSP and returns the search response message to the interconnecting server.

In step 5, the interconnecting server converts the returned search response message to a search response message based on the SIMPLE IM system protocol, and forwards it to the SIMPLE IM server.

In step 6, the SIMPLE IM server receives the search response message based on the SIMPLE IM system protocol, processes the message and forwards it to the IMPS user terminal.

It should be noted that, the search request message in the above steps 1 and 2, and the search response message in the above steps 5 and 6, can be carried by protocols such as HTTP application layer protocol, XML Configuration Access Protocol (XCAP), SIP/SIMPLE or Message Session Relay Protocol (MSRP), etc.

As described above, the method for searching across the WV-IMPS system and the SIMPLE IM system according to the present invention solves the problem on search function interconnection across different types of instant message systems.

In another aspect, the interconnecting server in the above method facilitates the conversion of messages between the WV-IMPS instant message system and the SIMPLE IM system, whereby it provides the basis for hardware implementations of the interconnection between the two systems.

Figure 5:
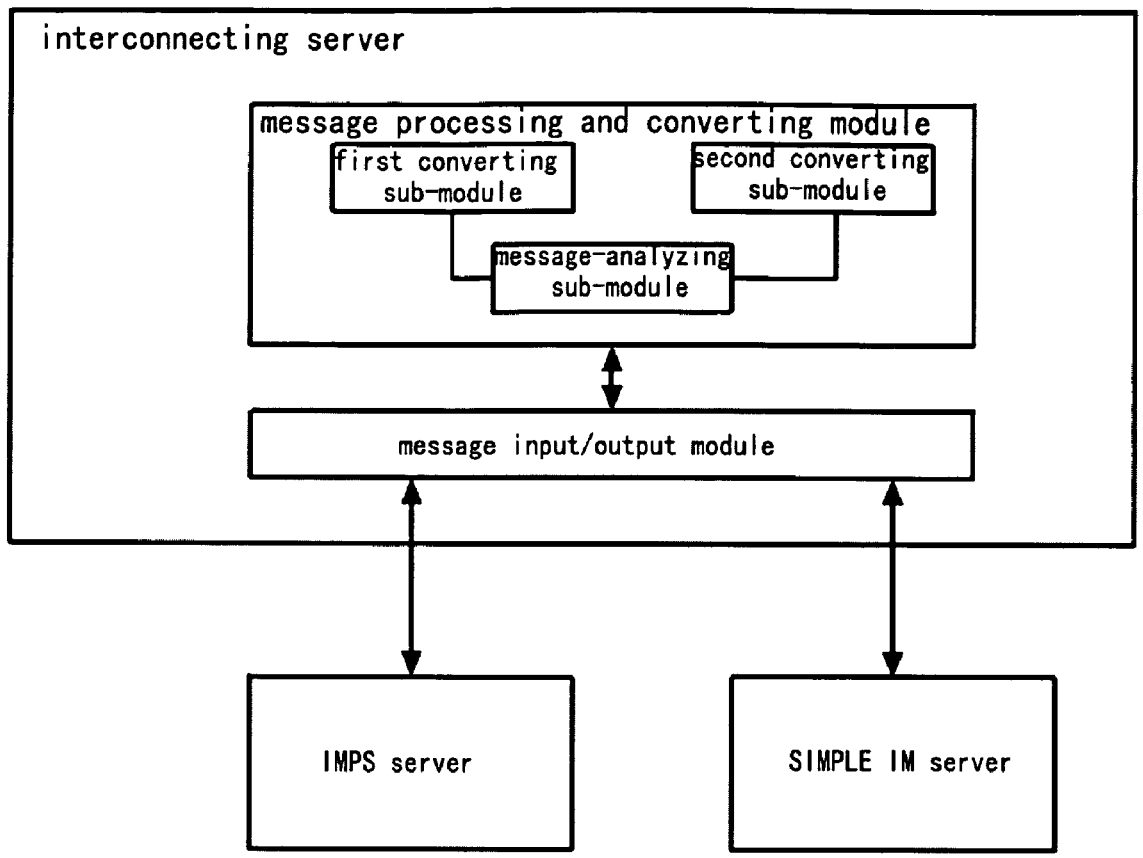
FIG. 5 is a schematic diagram showing the architecture of an interconnecting server according to an embodiment of the present invention.

FIG. 5 is a schematic diagram showing the architecture of the interconnecting server. As shown in FIG. 5, the interconnecting server generally includes a message input/output module and a message processing and converting module.

The message input/output module is connected with the IMPS server and the SIMPLE IM server; and may receive a search request message or a search response message from the IMPS server or the SIMPLE IM server, send the message to the message processing and converting module, further receive a message converted by the message processing and converting module and forward the message to the IMPS server or the SIMPLE IM server.

The message processing and converting module may analyze the search request message or the search response message, and implement the conversion between a SSP message from the IMPS server and a SIMPLE instant message from the SIMPLE IM server.

The message processing and converting module further includes a first converting sub-module, a second converting sub-module and a message-analyzing sub-module.

The first converting sub-module may implement the conversion from a SSP message to a SIMPLE instant message.

The second converting sub-module may implement the conversion from a SIMPLE instant message to a SSP message.

And the message-analyzing sub-module controls the first converting sub-module or the second converting sub-module to perform conversion according to the type of the message it receives.

It will be apparent to those skilled in the art that various modifications and variations can be made in the present invention without departing the spirit and the scope of the invention. Thus, it is intended that the present invention covers the modifications and variations of this invention provided they come within the scope of the appended claims and their equivalents.

What is claimed is:

1. A method for searching across instant message systems, which is applied to searching across a WV-IMPS instant message system and a SIP/SIMPLE instant message system, comprising:
    an IMPS user terminal initiating a search request message carrying key words for searching to an IMPS server;
    the IMPS server receiving the search request message, and judging according to the key words for searching so that when the search is desired within a SIMPLE instant message server, forwarding the search request message to an interconnecting server through a SSP message;
    the interconnecting server converting the SSP search request message to a SIMPLE instant message search request message, and forwarding it to the SIMPLE instant message server;
    the SIMPLE instant message server finding a search result matching the key words for searching and returning a SIMPLE instant message search response message to the interconnecting server;
    the interconnecting server converting the SIMPLE IM search response message to a SSP search response message, and forwarding it to the IMPS server; and
    the IMPS server processing the SSP search response message, and returning the search result to the IMPS user terminal.

2. The method according to claim 1, wherein after the IMPS server receives the search request message, it further searches locally for a corresponding result according to the key words for searching; and
    the search result returned to the IMPS user terminal by the IMPS server further comprises the result found locally by the IMPS server.

3. The method according to claim 1, wherein after the interconnecting server converts the SSP search request message to a SIMPLE IM search request message, it further forwards the SIMPLE instant message search request message to a plurality of SIMPLE instant message servers of the same type and interconnecting with each other.

4. The method according to claim 1, further comprising a step of the IMPS user terminal requesting to continue the search after receiving the search result, wherein the continuing search request message carries a search ID in the previous search response message and a start serial number of the previous search response message or the number of searching times.

5. The method according to claim 1, further comprising:
    the IMPS user terminal initiating a stop search request message to the IMPS server;
    and after receiving the stop search request message, the IMPS server performing the steps of:
    the IMPS server forwarding the stop search request message to the interconnecting server through a SSP message;
    the interconnecting server converting the SSP stop search request message to a SIMPLE instant message stop search request message, and forwarding it to the SIMPLE instant message server;
    the SIMPLE IM server stopping the current search and returning a SIMPLE instant message stop search response message to the interconnecting server;
    the interconnecting server converting the SIMPLE instant message stop search response message to a SSP stop search response message, and forwarding it to the IMPS server;
    the IMPS server returning the stop search response message to the IMPS user terminal.

6. A method for searching across instant message systems, which is applied to searching across a WV-IMPS instant message system and a SIP/SIMPLE instant message system, comprising:
    an SIMPLE user terminal initiating a search request message carrying key words for searching to a SIMPLE instant message server;
    the SIMPLE instant message server receiving the search request message, and judging according to the key words for searching so that when the search is desired within an IMPS server, forwarding the search request message to an interconnecting server through a SIMPLE instant message;
    the interconnecting server converting the SIMPLE instant message search request message to a SSP search request message, and forwarding it to the IMPS server;
    the IMPS server finding a search result matching the key words for searching and returning a SSP search response message to the interconnecting server;
    the interconnecting server converting the SSP search response message to a SIMPLE IM search response message, and forwarding it to the SIMPLE IM server; and
    the SIMPLE IM server processing the SIMPLE IM search response message, and returning the search result to the SIMPLE user terminal.

7. The method according to claim 6, wherein after the SIMPLE IM server receives the search request message, it further searches locally for a corresponding result according to the key words for searching; and
    the search result returned to the SIMPLE user terminal by the SIMPLE instant message server further comprises the result found locally by the SIMPLE instant message server.

8. The method according to claim 6, wherein after the interconnecting server converts the SIMPLE IM search request message to a SSP search request message, it further forwards the SSP search request message to a plurality of SSP servers of the same type and interconnecting with each other.

9. The method according to claim 6, further comprising a step of the SIMPLE user terminal requesting to continue the search after receiving the search result, wherein the continuing search request message carries a search ID in the previous search response message and a start serial number of the previous search response message or the number of searching times.

10. The method according to claim 6, further comprising:
the SIMPLE user terminal initiating a stop search request message to the SIMPLE IM server; and after receiving the stop search request message, the SIMPLE IM server performing the steps of:
the SIMPLE IM server forwarding the stop search request message to the interconnecting server through a SIMPLE instant message;
the interconnecting server converting the SIMPLE instant message stop search request message to a SSP stop search request message, and forwarding it to the IMPS server;
the IMPS server stopping the current search and returning a SSP stop search response message to the interconnecting server;
the interconnecting server converting the SSP stop search response message to a SIMPLE instant message stop search response message, and forwarding it to the SIMPLE instant message server;
the SIMPLE instant message server returning the stop search response message to the SIMPLE user terminal.

11. An interconnecting server, which is applied to searching across a WV-IMPS instant message system and a SIP/SIMPLE instant message system, comprising a message input/output module and a message processing and converting module, wherein
the message input/output module is connected with an IMPS server and a SIMPLE instant message server, and configured for receiving a search request message carrying key words or a search response message from an IMPS server or a SIMPLE instant message server and for sending the message to the message processing and converting module, and further for receiving a message converted by the message processing and converting module and for forwarding the message to the IMPS server or the SIMPLE instant message server; and
the message processing and converting module is configured for analyzing the search request message or the search response message, and for implementing a conversion between an SSP message from the IMPS server and a SIMPLE instant message from the instant message server.

12. The interconnecting server according to claim 11, wherein the message processing and converting module further comprises a first converting sub-module, a second converting sub-module and a message-analyzing sub-module, wherein
the first converting sub-module is configured to implement a conversion from a SSP message to a SIMPLE instant message;
the second converting sub-module is configured to implement a conversion from a SIMPLE instant message to a SSP message; and
the message-analyzing sub-module is configured for controlling the first converting sub-module or the second converting sub-module to perform a conversion according to the type of the received message.

13. A method for searching across instant message systems, which is applied to searching across a Wireless Village-Instant Message & Presence Service (WV-IMPS) instant message system and a SIP/SIMPLE instant message system, comprising:

receiving, by an instant message server of the IMPS system, a search request message carrying key words for searching from an IMPS user terminal;
forwarding, by the instant message server of the IMPS system, the search request message to an interconnecting server using the Server-Server Protocol (SSP) when determining that the search is desired within a SIMPLE instant message server;
receiving, by the instant message server of the IMPS system, a search response message based on the SSP, wherein the search response message carries a search result matching the key words for searching from the interconnecting server; and
by the instant message server of the IMPS system, processing the SSP search response message, obtaining and returning the search result to the IMPS user terminal.

14. The method according to claim 13, further comprising:
searching, by the instant message server of the IMPS system, locally for a corresponding result according to the key words for searching;
wherein the search result returned to the IMPS user terminal comprises the result found locally.

15. A method for searching across instant message systems, which is applied to searching across a Wireless Village-Instant Message & Presence Service (WV-IMPS) instant message system and a SIP/SIMPLE instant message system, comprising:
receiving, by a SIMPLE IM server, a search request message carrying key words for searching from a SIMPLE user terminal;
forwarding, by the SIMPLE IM server, the search request message to an interconnecting server using the SIMPLE IM system protocol when determining that the search is desired within a IMPS instant message server;
receiving, by the SIMPLE IM server, a search response message based on the SIMPLE IM system protocol, wherein the search response message carries a search result matching the key words for searching from the interconnecting server; and
by the SIMPLE IM server, processing the search response message, obtaining and returning the search result to the SIMPLE user terminal.

16. The method according to claim 15, further comprising:
searching, by the SIMPLE IM server, locally for a corresponding result according to the key words for searching;
wherein the search result returned to the SIMPLE user terminal comprises the result found locally.

17. An instant message server, which is applied to searching across a Wireless Village-Instant Message & Presence Service (WV-IMPS) instant message system and a SIP/SIMPLE instant message system, configured to implement a method comprising:
receiving a search request message carrying key words for searching from an IMPS user terminal;
forwarding the search request message to an interconnecting server through a SSP message when determining that the search is desired within a SIMPLE instant message server;
receiving a SSP search response message carrying a search result matching the key words for searching from the interconnecting server; and
processing the SSP search response message, obtaining and returning the search result to the IMPS user terminal.

18. An SIMPLE IM server, which is applied to searching across a Wireless Village-Instant Message & Presence Service (WV-IMPS) instant message system and a SIP/SIMPLE instant message system, configured to implement a method comprising:

receiving a search request message carrying key words for searching from a SIMPLE user terminal;

forwarding the search request message to an interconnecting server through a SIMPLE instant message when determining that the search is desired within a IMPS instant message server;

receiving a SIMPLE IM search response message carrying a search result matching the key words for searching from the interconnecting server; and processing the SIMPLE IM search response message, obtaining and returning the search result to the SIMPLE user terminal.

19. A method for searching across instant message systems, which is applied to searching across a Wireless Village-Instant Message & Presence Service (WV-IMPS) instant message (IM) system and a SIP/SIMPLE instant message system, comprising:

receiving, by an interconnecting server, a first search request message carrying key words based on a Server-Server Protocol (SSP) from an instant message server of an IMPS system, wherein a search requested by the first search request message is desired within an instant message server of the SIMPLE IM system;

converting, by the interconnecting server, the first search request message based on the SSP to a second search request message based on a SIMPLE IM system protocol;

forwarding, by the interconnecting server, the second search request message based on the SIMPLE IM system protocol to a SIMPLE IM server;

by the interconnecting server, receiving a first search response message carrying a search result based on the SIMPLE IM system protocol, and converting the first search response message based on the SIMPLE IM system protocol to a second search response message based on the SSP; and forwarding, by the interconnecting server, the second search response message based on the SSP to the instant message server of the IMPS system.

20. A method for searching across instant message systems, which is applied to searching across a Wireless Village-Instant Message & Presence Service (WV-IMPS) instant message (IM) system and a SIP/SIMPLE instant message system, comprising:

receiving, by an interconnecting server, a first search request message carrying key words based on a SIMPLE IM system protocol from an SIMPLE IM server, wherein a search requested by the first search request message is desired within an instant message server of the WV-IMPS system;

converting, by the interconnecting server, the first search request message based on the SIMPLE IM system protocol to a second search request message based on a Server-Server Protocol (SSP);

forwarding, by the interconnecting server, the second search request message based on the SSP to a IMPS server;

by the interconnecting server, receiving a first search response message carrying a search result based on the SSP, and converting the first search response message based on the SSP to a second search response message based on the SIMPLE IM system protocol; and forwarding the second search response message based on the SIMPLE IM system protocol to the SIMPLE IM server.

* * * * *